Figure 1:
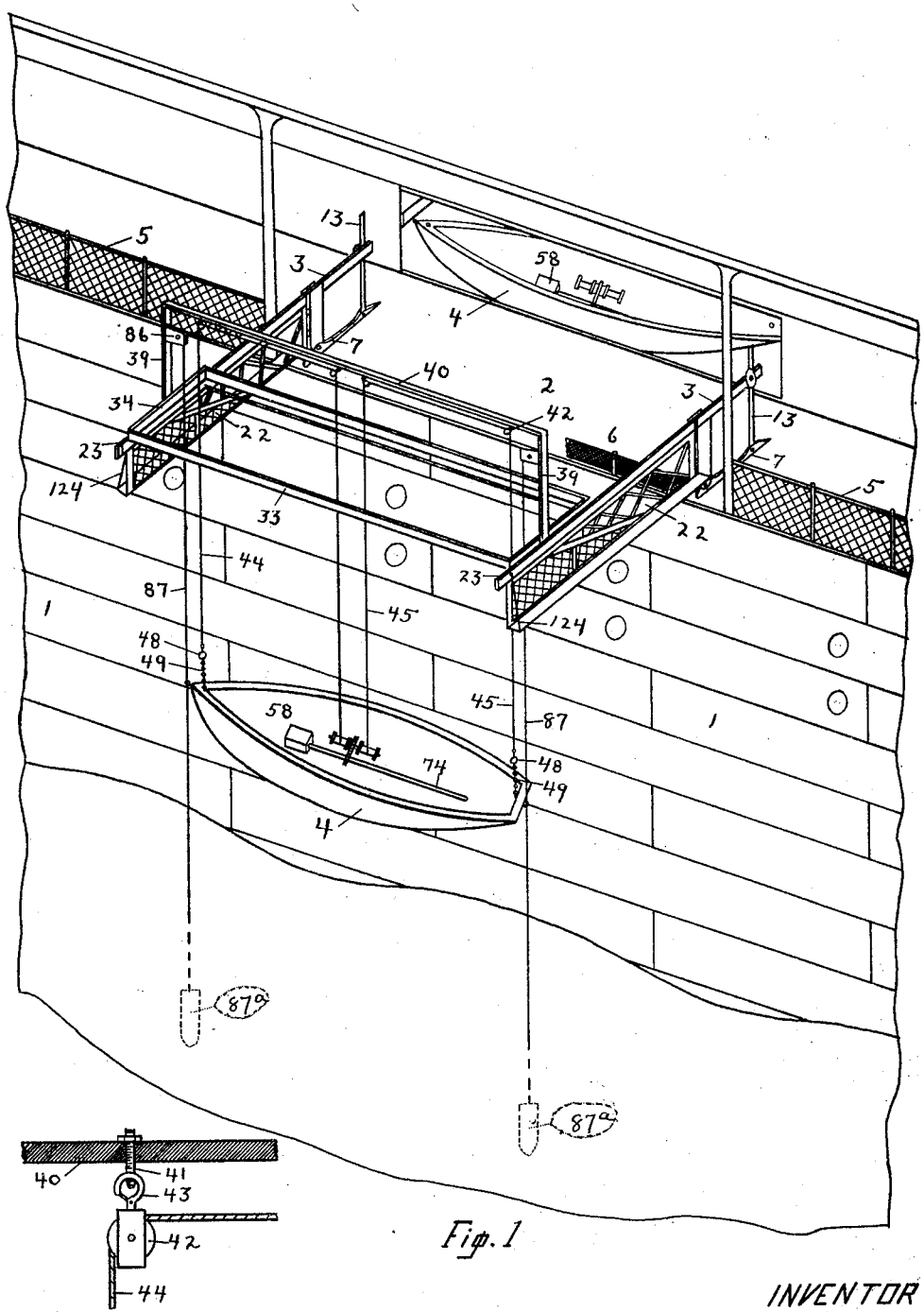

June 13, 1933.   W. CAMPBELL   1,913,830
DEVICE FOR HANDLING BOATS AND OTHER LOADS
Filed Oct. 13, 1931   4 Sheets-Sheet 2
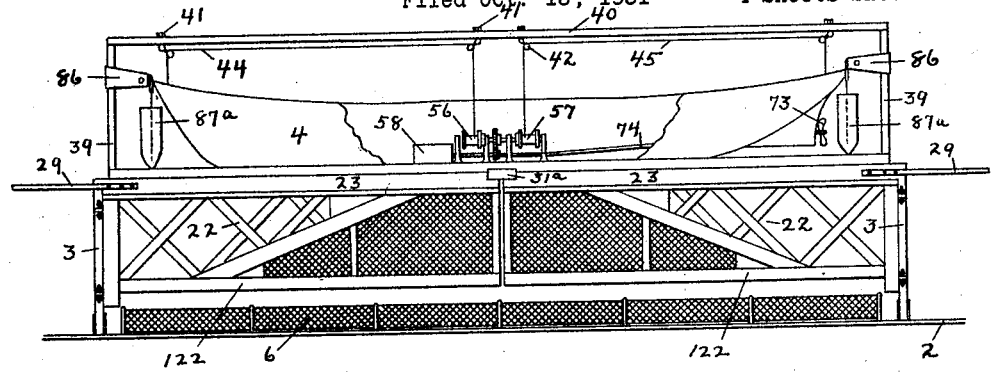
Fig. 2
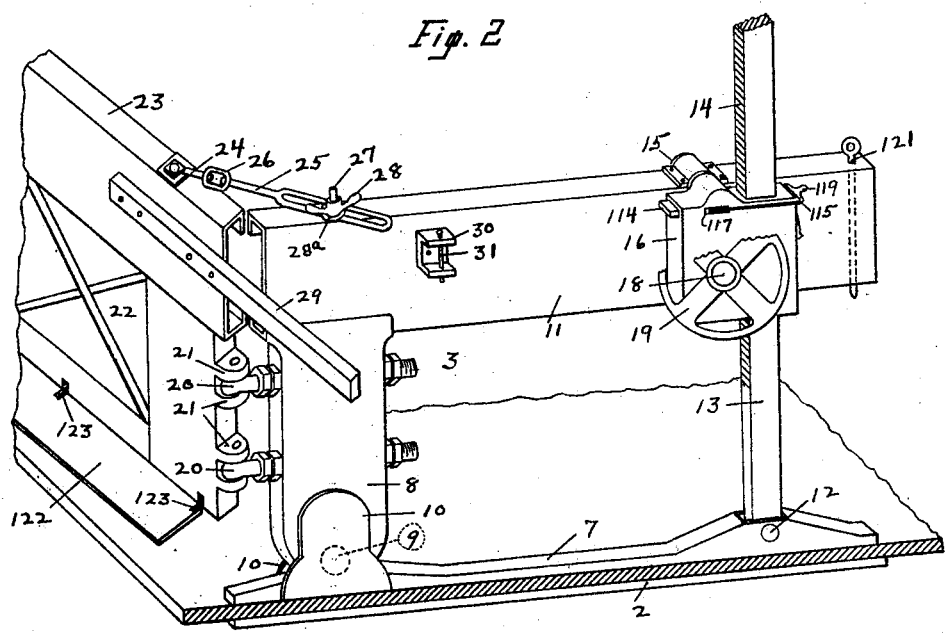
Fig. 3
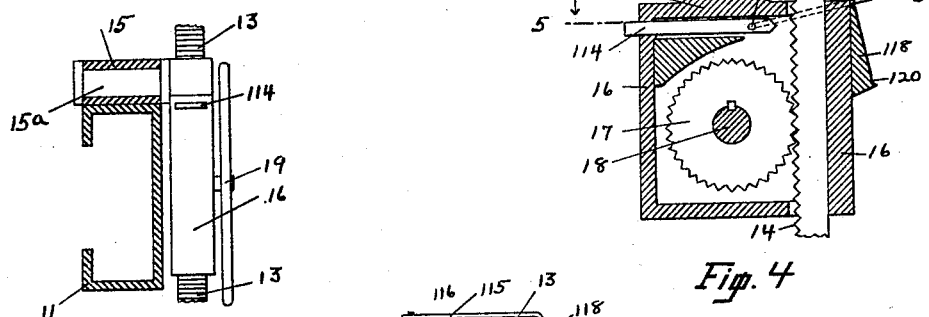
Fig. 5a   Fig. 5   Fig. 4
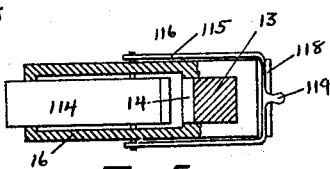
INVENTOR
Willard Campbell
per Samuel E. Fouts
Attorney June 13, 1933. W. CAMPBELL 1,913,830
DEVICE FOR HANDLING BOATS AND OTHER LOADS
Filed Oct. 13, 1931 4 Sheets-Sheet 3

INVENTOR
Willard Campbell
per Samuel E. Fouts
Attorney

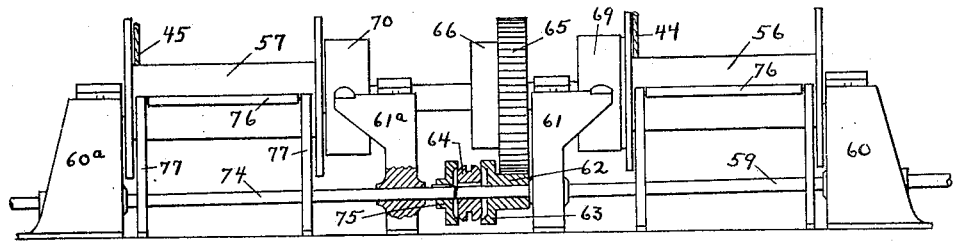

Patented June 13, 1933

1,913,830

UNITED STATES PATENT OFFICE

WILLARD CAMPBELL, OF LOS ANGELES, CALIFORNIA, ASSIGNOR OF FOUR-TENTHS TO SAMUEL E. FOUTS AND ONE-TENTH TO ROBERT M. FOUTS, BOTH OF LOS ANGELES, CALIFORNIA

DEVICE FOR HANDLING BOATS AND OTHER LOADS

Application filed October 13, 1931. Serial No. 568,633.

This invention relates, generally, to apparatus for raising and lowering boats or other devices or loads from or toward the water. While it is designed with special reference to the handling of life-boats, and while the details disclosed herein adapt it for that particular purpose, it is capable of more general use, and it is to be understood that the illustrations and descriptions are not intended as limitations upon the invention but as merely an example of a use to which it is adapted.

Assuming, therefore, that the invention is to be used for handling life-boats, it will usually be installed on a ship or vessel, as is the general practice. However, it may be installed elsewhere, as on the docks at life-saving stations, at light-houses or on various supporting structures. Wherever used, its purpose is to enable the boat to be raised from or lowered to the water in safety and while under perfect control; to prevent the boat from swaying, due to high waves, and from crashing into its supporting structure, whatever it may be; to prevent the boat from tipping sidewise before it is launched or cast off; to enable the boat to be readily cut adrift from its cables when it is once launched or to be readily stored when it is hoisted from the water, and to prevent the cables from becoming slack and kinking due to the rise and fall of the boat with the waves. When the invention is used aboard ship, a further object is to clear the boat from the side of the ship so that it may be raised and lowered without contact with the latter notwithstanding the heavy listing of the ship or the roughness of the seas.

It is for the last stated use that the invenion is herein illustrated and described; but, as stated, this specific disclosure is for illustrative purposes only, and the claims hereof are not intended to be limited to a device for that particular use except as they are specifically restricted thereto by their terms.

It is the present practice to lower and raise life boats by means of davits, which extend upwardly in spaced relation near the vertical edge of the ship. These davits are adapted to swing inwardy over the deck and outwardly so as to project beyond the deck, a pulley being carried upon the upper end of each of the davits. When the davits are swung outwardly, these pulleys hang beyond the side of the ship and the life boat is then in position to be raised or lowered. However, but little clearance is allowed for the boat so that, in rough water, it is almost certain to bump against the side of the ship and possibly be crushed. When the ship is listed toward the davits the boat may usually be lowered or raised without substantial difficulty in this regard. But if the ship be listed away from the davits, the boat can be lowered but a short distance before it contacts with the inclined side of the ship so that further downward movement is prevented or results in great danger of over-tiping the boat. If, added to this condition, the sea be rough so that the ship is rocked, disaster is almost certain.

In my invention the boat is suspended from a traveling carriage which is normally supported upon an adjustable stand having tracks thereon for the carriage wheels. The tracks of this stand terminate within the vertical plane of the ship's side; but the stand is provided with a pair of gate-like members which are pivoted thereto so that they may be extended out over the side of the ship. These members, which will herein be termed gates, are provided with tracks corresponding to the respective tracks of the stand. When they are extended and secured in their extended positions, the tracks of the stand and of the gates are continuous and the carriage with its boat may be moved as far out on the gates as may be necessary to permit the boat fully to clear the side of the ship. The boat may be lowered either by hand or by power, preferably in the latter way. The motor for controlling the boat may be mounted within the boat itself, as in one form hereinafter described, or it may be mounted upon the carriage, as in another form. A further feature of the invention comprises means whereby the stand and the gates may be tilted in a vertical direction so as to cause the gates to project at any desired angle, notwithstanding the angle at which the ship may then be listed.

Figure 6:
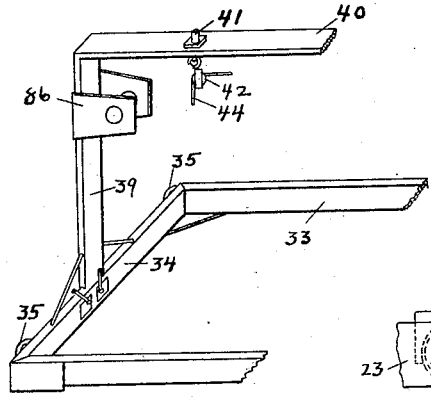
Figure 7:
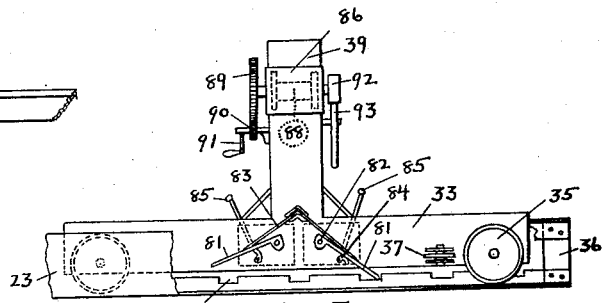
Figure 8:
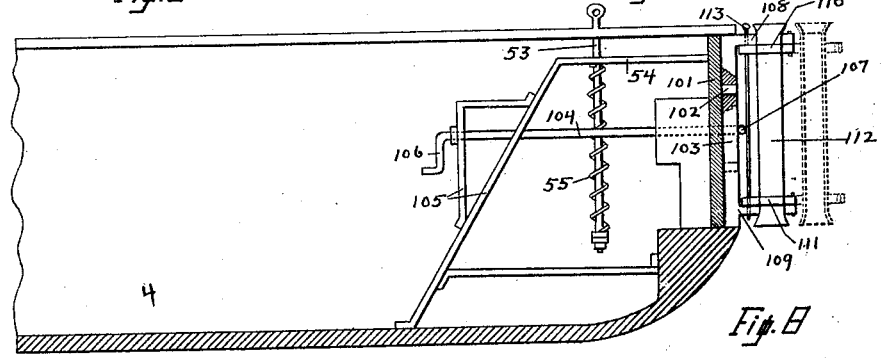
Figure 9:
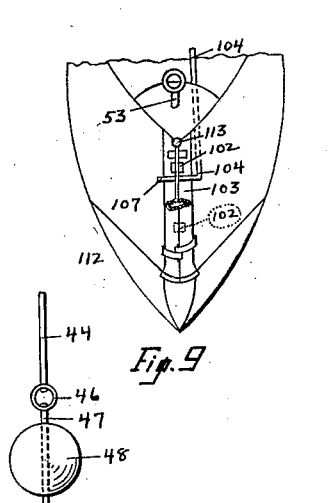
Figure 11:
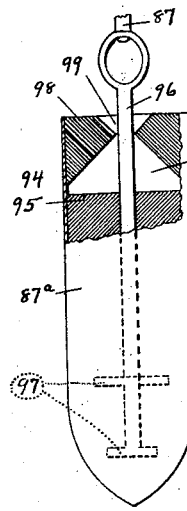
Figure 10:
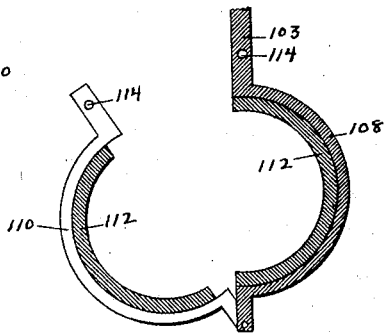
Figure 12:
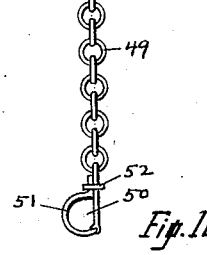
Figure 13:
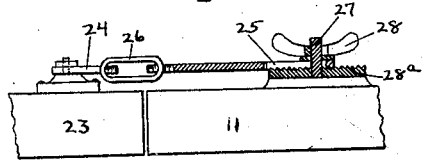

Taking up the drawings forming a part of this application, Fig. 1 is an isometric view showing a portion of a ship embodying my invention, the gates being open, a boat being lowered or raised from the water and the weights with their cables lowered to prevent the boat from swinging; Fig. 1a is a view, partly in section, showing one of the pulleys for the suspended boat and its means of attachment to the boat carriage; Fig. 2 is a front elevation of the invention with the gates in their closed positions and the boat suspended from the carriage, the boat being partially broken away to show the hoisting mechanism therein; Fig. 3 is an isometric view showing one end of the adjustable stand and its respective gate hinged thereto, the latter being in a partially closed position; Fig. 4 is a vertical sectional view through the casing of the device for adjusting the angle of the stand; Fig. 5 is a sectional view taken through Fig. 4 on the line 5—5 and looking in the direction of the arrows thereon; Fig. 5a is a view, partly in section, showing a detail of the structure of Fig. 3; Fig. 6 is an isometric view of one end of the boat carriage; Fig. 7 is an end view of the carriage in position on the track of one of the gates, the said track being partially broken away more fully to disclose the controlling mechanisms of the carriage, the view also showing the hoisting mechanism for one of the steadying cables; Fig. 8 is a vertical section through one end of the boat showing the means thereon for engaging with the steadying cable for preventing the boat from swinging, said view further showing the means for disengaging the boat from said cables; Fig. 9 is a detailed perspective view of one end of the boat showing a part of the said cable engaging device and the means for attaching the same to the boat; Fig. 10 is a transverse view through the said cable engaging means, the latter being in its partially opened position; Fig. 11 is a vertical sectional view through one of the weights comprising part of the means for preventing the boat from swinging and tipping; Fig. 12 shows the lower end of one of the hoisting cables and the means thereon for attaching the cable to the boat; Fig. 13 is a view of the means for drawing the gate endwise into engagement with the stand and for assisting in holding the gate in its closed position; Fig. 14 is a side elevation of the hoisting mechanism for the boat, portions of the same being in section; Fig. 15 shows a portion of the opposite side of the hoisting mechanism from that of Fig. 14 and the braking mechanisms for controlling the rotation of the hoisting drums; Fig. 16 is an isometric view showing a corner of the boat carriage with a broken portion of the track; Fig. 17 is a plan view of a modified form of my invention in which the hoisting mechanism is mounted upon the carriage; Fig. 18 is a side elevation of the structure shown in Fig. 17, and Fig. 19 is a sectional view through one of the hoisting drums and the means for holding the cable in place thereon.

Referring to the drawings, and particularly to Fig. 1, 1 designates the side of a ship having a deck 2 upon which the principal elements of my invention are mounted. As has been stated, the invention may be mounted upon other kinds of structures and the fact that it is illustrated and described as located on a vessel is not to be taken as a limitation on its use. Upon the deck 2, at any suitable part of the vessel, are the members which will herein be referred to as the stands, the same being generally designated 3. There are two of these stands which extend transversely of the boat and in spaced relation, the distance between them being somewhat greater than the length of the boat 4. In Fig. 1, two boats are shown, one being stored aboard the ship at the rear of the stands and the other being suspended in mid-air. Sufficient space on the ship may be provided for the storage of other boats, the number of boats on board being adequate to carry all of the persons on the ship in case it should become necessary completely to abandon the latter, and a sufficient number of stands and gates would be provided for handling all the boats. The ship is provided with the usual guardrails 5 beyond or outside the space between the stands 3 and with a low rail 6 between said stands. The gates close above the rail 6, as shown in Fig. 2.

Attention will now be directed to Fig. 3 for details of the structure of the stand 3. The stands are in pairs, and a description of one will suffice for both. Upon the deck 2, and extending transversely thereof, is secured a base member 7, to the front or outer portion of which is pivoted the lower end of the vertical member 8 of the stand, said member being pivoted at 9. To give greater stability to the stand, the base member is provided with upstanding flanges 10 between which the member 8 extends and with which it contacts. The stand has a horizontal portion 11, also, the parts 8 and 11 being rigidly secured together and forming substantially a right angle, as shown. Adjacent their rear or inner ends, the base members 7 have pivoted thereto, at 12, bars 13, the same being mounted for swinging in vertical planes toward and from the side of the ship. The bars are provided with ratchet or gear teeth 14 on their outer faces, as is most clearly shown in Fig. 4. The horizontal portion 11 of the stand has a journal-bracket 15 on its upper edge within which turns a pin 15a which projects from a casing 16 at the side of the stand. The bar 13 passes through this casing, as shown in Fig. 4, and a ratchet or gear wheel 17, within the casing, engages with the teeth 14. The wheel 17 is secured to a shaft 18 which projects through the side of the casing and carries means, as a hand wheel 19, for turning the shaft. Means, hereinafter described, are provided for locking the casing 16 to the upright 13. The pin within the journal-bracket 15 is rigidly attached to the casing 16 so that the latter is pivotally mounted on the stand. When, therefore, the shaft 18 is rotated, the ratchet wheel 17 travels up or down the bar 13, thereby tilting the stand 3 upon its pivot 9, the pivotal connection of the casing 16 accommodating this movement.

Rigidly secured to the upright portion 8 of the stand are hinge members 20 which cooperate with complementary members 21 on the outer ends of the gates. These gates are designated generally by 22, the same being shown in their open position in Fig. 1. They are of equal length and meet at their ends when closed, as shown in Fig. 2.

The upper rail 23 of the gate and also the horizontal member 11 of the stand are made up of C-shaped channels, as is plain from Figs. 3 and 5a, the open part of each channel being on the inner side so that these open parts of the two gates and stands face each other. These channels form tracks or runways for the boat carriage, hereinafter described. Pivotally connected to the upper edge of the gate 22 is an adjustable brace, which is illustrated in detail in Fig. 13. It comprises an eye member 24 and a slotted ratchet member 25. These two members form part of a turnbuckle, each of them having a threaded stem which cooperates with a nut member 26 by means of which the turnbuckle may be lengthened or shortened, as is obvious. The slot of the member 25 passes about a vertical bolt 27 on the stand, and the member 25 is clamped in any desired position by a wing-nut 28 on said bolt, the nut forcing the ratchet member 25 into engagement with a ratchet washer 28a which surrounds the bolt so that slippage is prevented. When the gate 22 is swung outwardly, as in Figs. 1 and 13, the nut 28 having been previously loosened, the said nut is then tightened and the turnbuckle member 26 is then turned to draw the gate closely into contact with the stand, thereby forming a continuous rail or track for the carriage. To close the gate, the wing-nut 28 is loosened and the gate is swung into its closed position by means of a lever bar 29 which is attached to the gate and projects beyond the same, as shown particularly in Figs. 2 and 3. When the gate is closed, the nut 28 is again tightened so that the turnbuckle holds the gate in place. For holding said gate more securely in its open position, the lever bar 29 is held within a U-shaped bracket 30 on the side of the stand, a pin 31 being then passed though the bracket outside of but in substantial engagement with the bar. The same bar may also serve to hold the gate in its closed position by the engagement thereof with a suitable bracket on the guard-rail 5 or upon some other suitably placed structure. Or, if found desirable, the ends of the closed gates may be held together by a suitable clip, as indicated at 31a on Fig. 2.

The channel-bars forming the upper rail 23 and the horizontal member 11 of the stand are each provided with notches 32, as best shown in Figs. 7 and 16. These notches are adapted to be engaged by detent pawls, hereinafter more particularly described, for holding the carriage in any position to which it may be moved. This carriage comprises a horizontal open frame having side members 33 and end members 34, the said members being suitably and rigidly attached together. In that form of device which is illustrated in Figs. 1, 2, 6 and 7, the end members 34 of the carriage are provided with wheels 35 adjacent each of the corners of the frame, which wheels run within the channel-bars forming the carriage tracks. As shown in Fig. 16, the outer end of the channel-bar 23 is provided with a stop 36 against which the carriage frame may contact in case the latter should be moved to the extreme end of the gate. It will be understood that the carriage, with its suspended boat and passengers, will have considerable weight and momentum and that the wheels 35 would be liable to be thrown out of alinement or their axles sprung or broken if the wheels came in direct contact with the stop. To steady the carriage in its movements, the end members 34 of the frame are provided with rollers 37 suitably mounted in brackets 38 on said members adjacent the wheels 35. The wheels 37 are journaled on vertical pins or axles and they roll against the inner vertical faces of the channel-bars. The brackets 38 of said wheels overhang the lower and inner edges of the channel-bars so as to be in position to engage therewith in case the wheels 35 or their axles should break, thus preventing the carriage from falling or being seriously racked or twisted.

Rising centrally from each of the end members 34 of the carriage frame are vertical members 39, the same being connected at their tops by a bridge member 40. The boat, when connected with the carriage, is suspended from this bridge member, for which purpose the latter is provided with eye-bolts 41, as best seen in Fig. 1a. In that form of the invention in which the hoisting mechanism for the boat is mounted within the latter, there are four of the eye-bolts 41, each of which supports a pulley 42, the block of which has a snap-hook 43 which engages with the respective eye-bolt but which can be readily detached therefrom, as is obvious. Two of the pulleys are placed adjacent the ends of the bridge member approximately over the ends of the suspended boat, while the remaining two pulleys are near the central part of said member, as is shown in Figs. 1 and 2. About the pulleys are passed the cables 44 and 45, the former of which extends downwardly to the front end of the boat and also to a winding drum of the hoisting mechanism in the boat. The cable 45 extends from a second hoisting drum in the boat upwardly about two of the pulleys 42 and thence downwardly to the rear of the boat. Fig. 12 shows the lower end of one of these cables and the special construction thereof which enables it to be attached to the boat, to be maintained taut and to permit the boat to move up and down with the waves without slackening the cables and causing them to kink or wind unevenly on their drums. To accomplish these results, the cable is connected to a swivel 46, and the latter is connected to a bolt 47 to which is attached a weight 48. The lower end of the bolt is connected to a chain 49 which carries a hook 50 at its lower end. This hook comprises a pivoted member 51 which is held in its closed position by a sliding ring 52. When in the position of Fig. 12, this ring holds the hook closed; but when it is moved upwardly it releases the pivoted member 51 so that an outward or a downward pull on this member swings the latter open to release the boat.

Fig. 8 shows one end of the boat with the means for attaching the hook 50 of the hoisting cable thereto. This means comprises a relatively long, vertical, eye-bolt 53 which passes through the deck of the boat and downwardly into the interior of the latter. Within the boat is a brace 54 through which the eye-bolt passes and against which bears the upper end of a helical spring 55 which surrounds the bolt and is held thereon by washers and a nut at the lower end of the latter. This structure takes up the shocks due to wave action, it being understood that when a wave lifts the boat, slackens the chain 49 and then subsides, the boat will drop. If it were rigidly attached to the chain 49, this dropping of the boat would result in severe shocks. However, these shocks are cushioned by the spring 55 which is compressed and is again expanded when the boat returns to its more normal position.

While the hoisting mechanism within the boat may take various forms, I have illustrated in Figs. 14 and 15, somewhat diagrammatically, a form of such mechanism which is adaptable for use in my invention. It comprises two rotatable drums 56 and 57, the drum 56 being preferably adjacent the hoisting motor or prime mover, the latter being conventionally shown at 58 in Figs. 1 and 2. This motor drives, through any suitable connection, a rotatable shaft 59, see Fig. 14, which is journaled in or to the frame blocks 60 and 61 of the hoisting mechanism. Adjacent that end of the shaft which is opposite the motor is a pinion 62 having a clutch member 63 rigidly connected therewith. The pinion and clutch member are mounted loosely on the shaft so that the latter may rotate without turning the pinion. Beyond the pulley, and keyed to the shaft at substantially its end, is a sliding clutch member 64 which is adapted to be moved into or out of engagement with the clutch member on the pinion. When it is in engagement with the latter, the pinion 62 is rotated with the shaft. This pinion meshes with a gear 65 which is mounted co-axially with the hoisting drums 56 and 57. Connected with the gear 65 is a housing 66 for a set of differential gearing. The axles of the two drums are connected together through this differential gearing so that the drums may be driven differentially, as is common in the driving mechanism of the rear axle sections of automotive vehicles. This differential mechanism is so well understood by those skilled in the art that specific illustration and description thereof is believed to be unnecessary and undesirable.

The drum 56 is provided with a brake flange 67, and the drum 57 with a similar brake flange 68. (Fig. 15). With these flanges cooperate brake bands 69 and 70, respectively. These bands are under separate control by the operator in the boat through suitable mechanisms, indicated conventionally by the members 71 and 72, of Fig. 15. No claim is made to the invention of any particular type of brake and, since these devices are so well known in the art, further illustration and description is believed to be unnecessary. With the mechanism thus described, the operator in the boat may simply throw the clutch member 64 into driving connection with the pinion 62 to cause the hoisting drums 56 and 57 to rotate and thus to lift the boat. If one end of the boat were lower than the other, the boat can be evened up by simply throwing into action the brake of that drum which is connected with the more elevated end of the boat, whereupon the speed of rotation of that drum is retarded and the driving action from the pinion 62 is mainly transmitted through the differential gearing of housing 66 to the other drum, the movement of which is thus accelerated until the boat is brought to a level keel.

It is desirable that the same motor or prime mover which drives the hoisting mechanism also serve to drive the boat propeller, the latter being indicated at 73, in Fig. 2. Accordingly, I extend a shaft 74 from said propeller substantially to the end of the shaft 59, the two shafts being in alinement. The shaft 74 is suitably journaled in or on the blocks 60a and 61a of the hoisting mechanism and is provided with a clutch member 75 on its end which is adjacent the sliding clutch member 64. The member 75 is keyed or otherwise rigidly attached to the shaft 74 so that the latter may be driven when the member 64 is brought into engagement with the member 75. With this arrangement, it is obvious that the motor 58 may be employed alternately to hoist the boat or to drive the latter through the water by means of the propeller 73. No power is required to lower the boat, since the weight of the latter and its load of passengers will accomplish that result. The motor may, therefore, be entirely disconnected from both the hoisting mechanism and the propeller simply by bringing the clutch member 64 into its intermediate position, as is indicated in Fig. 14, in which position it is out of contact with both clutch members 63 and 75. The boat is kept under control, while lowering, by the application of the brake bands 69 and 70 which may be so manipulated as to maintain the boat on a level keel.

It is, of course, desirable to have the cables 44 and 45 wind evenly and regularly upon their drums and not loosen thereon in case the suspended boat or other load rises upon a wave and thus puts slack in the cables. This result is largely attained by the use of the weights 48 and the chains 49 hereinbefore described. As a further preventive, however, I provide each drum with a pressure roller 76 which extends alongside the drum, being journaled upon the upper ends of resilient arms 77 whereby they are pressed toward the drums.

The ends of the cables 44 and 45 are preferably attached to the drums by passing a knot 79 thereon through a keyhole-shaped opening 80 in the drum and then drawing the cable into the smaller end of the opening, as indicated in Fig. 15. With this structure, when the boat is lowered to the water and the cables are unhooked from the ends of the boat, the weights 48 sink into the water and hold the cables taut. The drums are further rotated until the cables are fully unwound when the pull upon the cables due to the weights will automatically detach the latter from the drums, thus leaving the boat entirely free. When, thereafter, the carriage is moved backwardly over the deck, the cables may be drawn backwardly, attached to the next boat and its winding drums, and the cables then wound upon the latter until the boat is ready to be suspended from its carriage preparatory to launching it. In practice, however, there would ordinarily be no time to apply the loose cables to the next boat in the manner stated. Each boat is, therefore, preferably supplied with its own cables 44 and 45 and with its own pulleys 42 and snap hooks 43. When the carriage with its dangling cables is run back over the deck 2, the cables are preferably detached at the snap hooks 43 and the latter are hooked over the low guard rail 6 without bothering to wind up the cables. The snap hooks 43 of the boat next to be launched are then hooked into the eye-bolts 41 and, the cables of that boat being already in position upon their drums, the boat is ready for launching.

Referring again to Fig. 7, each end of the carriage is provided with a pair of detent pawls 81 which are pivoted at 82 and which are adapted to engage with the notched edges of the channel-bars. These pawls are pressed downwardly by a spring 83 which is secured to the carriage frame at its mid-point and bears with its ends upon the upper surfaces of the pawls. The pawls are lifted out of engagement with the channel-bar by cams 84 which are rocked by hand-levers 85 on the carriage. As shown in Fig. 7, the right-hand pawl is in engagement with a notch 32 so that the carriage cannot move in the right-hand direction. The left-hand pawl is lifted and the carriage can be moved to the left, the right-hand pawl tripping over the notches during this movement. To hold the carriage against left-hand movement, the left-hand pawl is dropped by rocking its lever 85 and its cam 84, and to hold the carriage against movement in either direction, both pawls are dropped into engagement with the channel-bars.

In raising or lowering boats or other loads from or toward the water in heavy seas, the boat tends to sway back and forth like a pendulum, and it has been amost impossible to prevent the boat from crashing into the side of the ship or other structure from which the boat is suspended. This very often results disastrously, and it is one of the objects of my invention to keep the boat or load from swaying in these circumstances. For that purpose I mount, preferably upon the upright members 39 at the ends of the carriage, brackets 86 within which I journal hoisting drums for cables 87, which will hereinafter be referred to as the steadying cables. In Fig. 7, the drum for one of the steadying cables is indicated in dotted lines at 88, the same having an axle to one end of which is connected a large gear 89, the same meshing with a pinion 90 on a hand-operated shaft, the crank of which is shown at 91. By turning this crank the steadying cable may be wound upon the drum, as is obvious. Upon the opposite end of the drum axle is a brake wheel 92 with which a suitable brake 93 may be engaged to hold the drum from too free rotation in unwinding. At the free end of each of the cables 87 I suspend a relatively heavy weight 87a; and the cables are made long enough to permit these weights to be lowered into the water for some considerable distance. Even in the roughest weather, the water is substantially undisturbed a relatively few feet below the surface. In practice, therefore, these weights are lowered until they reach the water which is relatively quiescent, and they are of sufficient weight to hold their cables taut. Fig. 11 is a detailed view showing a section through one of these weights as I prefer to make it, although the same may be made up of various shapes and of various structures. As shown, a sheet metal container 94, shaped somewhat like a plumb-bob, is filled to the point indicated at 95 with molten lead, an anchoring rod 96 first having been positioned within the container. The rod is preferably provided with flanges or other irregularities 97 to prevent the rod from pulling out of the weight when it is suspended from its cable. After the lead has set, a member 98 is inserted in the open end of the container and is held in position in any suitable manner. The member surrounds the anchoring rod 96 leaving a small clearance and a small, funnel-shaped cavity 99 is thus provided about the rod. Between the member 98 and the lead at 95 is a chamber 100 to be filled with oil. Before the weights are lowered into the water this chamber is filled and, when the weight is lowered into the water the latter, which is heavier than the oil, flows in about the anchoring rod, displaces the oil and forces it out where it mingles with the water and thus stills or tends to still the waves, as is well understood.

The means which I preferably employ for attaching the boat to the steadying cables is shown in Figs. 8, 9 and 10. It is to be understood that the boat is thus attached at or adjacent both of its ends and that the devices employed for this purpose are substantially identical. The boat is provided with a member 101 from the outer side of which project two or more pins 102. Outside of the member 101 is a plate 103 having openings or sockets therein for the reception of said pins when the parts are assembled together. They are thus assembled by simply bringing the plate 103 into contact with the member 101 with the pins projecting into the said openings, as shown in Fig. 8. The plate is then held in position by a rock bar 104, which passes through the member 101 into the boat interior where it is supported by frame members 105. The rock bar is turned by means of a crank 106 within the boat. Its outer end is turned at substantially a right angle to the bar so as to project at 107 across the outer face of the plate and hold it in position on the pins 102. The plate 103 has an outwardly extending curved jaw 108 at its upper end and a similarly shaped jaw 109 near its lower end, the jaw 108 being shown in the transverse sectional view of Fig. 10. Pivoted to the outer ends of the jaws 108 and 109 are cooperating jaws 110 and 111 respectively, the latter being curved similarly to the other jaws and forming therewith, when the jaws are closed, ring-shaped holders for metallic guide members 112. These guide members, when the jaws are shut, form an elongated tube which closes about the steadying cables 87 and slide upon the latter as the boat is raised or lowered. The jaws are held in their closed position by a pin 113 which is projected downwardly through openings 114 in the several jaws, said openings being in alinement when the jaws are closed. When the pin 113 is removed, the jaws may be opened, as indicated in dotted lines in Fig. 8 and also as indicated in Fig. 10, thereby releasing the boat from the cables. It is sometimes necessary to make a quick getaway with the boat and, in such case, the rock bar 104 may simply be turned so that its bent end 107 releases the plate 103 and permits the latter with the jaws and guide members to remain on the steadying cables. It will be noted that the guide members 112 are of considerable length, and they may be made even longer than shown if found necessary or desirable. The tubular openings through them are of sufficient diameter to fit about the sustaining cable 87 somewhat snugly yet with sufficient freedom to permit the boat to slide freely along them. The cables are held taut by the weights 87a so that they cannot be easily bent or deflected. With this construction, the boat is prevented from tipping sidewise due either to the waves or to the overloading of the boat at one of its sides. It will, of course, be evident that the weights cannot be easily moved sidewise in the water so that the steadying cables not only prevent the boat from swaying but also prevent it from tipping.

Reference has been made to the means for locking the gear casing 16 to the ratchet or rack bars 13 to hold the stand 3 in any position to which it may have been adjusted. This means comprises a sliding detent plate 114, shown more particularly in Fig. 5. The inner end of this plate is formed to fit into the teeth 14 of the bars 13 and to be held therein so that the gear casing and the horizontal member 11 upon which it is mounted may not move. The detent plate is slid horizontally by means of a swinging bail 115 which is pivoted upon pins 116 which project outwardly from the plate through slots 117 in the sides of the gear casing, one of said slots appearing in Fig. 3. On the rear side of the casing 16 is a wedge-shaped member 118 over which the bail moves and with which it engages, the bail being provided with a projecting handle 119 to facilitate its operation. The member 118 is provided with a notch 120 at both its upper and lower ends into which notches the transverse portion of the bail may rest and be held. As shown in Fig. 4, the detent plate is in its retracted position and the bail is resting in the upper one of the notches 120. By swinging the bail downwardly until it rests in the lower notch, the detent plate is pulled into engagement with the teeth 14 of the ratchet bar.

The carriage is prevented from moving too far rearwardly in the stand 3 by a pin 121 in the rear end of the horizontal member 11, said pin extending across the channel-bar in position to engage the rear wheels of the carriage. This pin and the stop 36 at the far end of the gate prevent the carriage from moving too far either in the rearward or forward direction. In the operation of the invention, the stand 3 and the gates 22 may be tilted either above or below the horizontal so as to cause the carriage to travel by gravity on its rails. Since the carriage will be thus moved in circumstances which call for speed of operation, these stop devices are essential to safety.

While the carriage is above the deck 2, its movements can readily be controlled by persons on the deck. In order that this same control may be exercised after the carriage has passed onto the gates, the latter are desirably provided with platforms 122 which are hinged to the outer sides of the gates, some of the hinges appearing at 123 in Fig. 3. Any suitable means may be employed for holding the platforms in their horizontal positions, Fig. 1 indicating a member 124 for that purpose. When the gates are closed the platforms are preferably turned upwardly into vertical position, as in Fig. 2, in which position they may be held by any suitable and obvious means.

The foregoing description has been of that type of the invention in which the hoisting mechanism is located in the boat, and that is the preferred form of my invention when the boats are provided with motors for propulsion through the water. However, most of the life boats heretofore employed have been propelled by oars and have not been provided with motors. For handling boats of that type, I mount the hoisting mechanism upon the carriage, in which construction the carriage is of the general nature of an overhead traveling crane. It is, of course, clear that this type of the invention is adapted for raising and lowering boats having motors therein as well as for handling various other kinds of loads. Figs. 17 and 18 show the invention having the motor and hoisting mechanism on the carriage. In said figures, the side and end members of the carriage frame are designated respectively 33a and 34a, parts in each of said figures being broken away more clearly to show these members. The super-structure of the carriage may be of any suitable construction, the drawings showing a form in which there is a vertical upright 125 at each of the four corners, it being understood that the frame is rectangular and open to permit the passage of the boats therethrough. Extending longitudinally at the tops of the uprights 125 and parallel with the members 33a are top frame members 126. A similar member 127 extends longitudinally at the top of the frame parallel to and approximately midway between the top members 126. Upon the said members 126 and 127 the hoisting mechanism is mounted. This comprises any suitable motor, which is designated 128, upon the shaft 129 of which is a beveled gear 130. Splined upon the outer end of the shaft is a clutch member 131 which is adapted to be moved into engagement with a complementary clutch member 132 on a shaft which carries a worm 133. When the clutch members are brought into engagement, the worm is driven with the motor shaft. The clutch member 131 is slid upon the shaft by a yoke lever 134 which is rocked by a link 135 which extends to any convenient position for hand operation. The worm 133 meshes with a worm wheel 136 on a shaft 137 which carries a pinion 138 on its outer end. This pinion meshes with a large gear 139 on one of the hoisting drums 140, said drum being suitably journaled on the carriage members 126 and 127. A cable 141 extends from this drum, first about a sheave 142 mounted to turn on a vertical axis, and thence around a sheave 143, mounted on a horizontal axis and thence downwardly to one end of the boat, which is not shown in Figs. 17 and 18 but which may be the same as or similar to boat 4.

Connected with the worm wheel 136 is a differential gear housing 144, having therein a set of differential gearing like that in the housing 66 of Fig. 14. This differential gearing connects the shaft 137 with a coaxial shaft 145 upon which is mounted a pinion 146 which meshes with a large gear 147 on a second winding drum 148. Connected with the latter drum is a cable 149 which extends first to a sheave 150 mounted on a vertical axis and thence to a similar sheave 151 which is mounted on a horizontal axis beneath the member 127 of the carriage, said latter sheave being indicated in dotted lines in Fig. 17. From the sheave 151 the cable 149 passes downwardly to the boat at or adjacent its end which is opposite the end to which the cable 141 is attached. By suitable braking mechanism, not shown, the speed of rotation of the two drums can be regulated so as to keep the boat level, as has been described in connection with the structure shown in Figs. 14 and 15.

The beveled pinion 130 on the motor shaft meshes with a beveled gear 152 loosely mounted on a horizontal shaft 153. On the gear 152 is a clutch member 153, with which a clutch member 154 is adapted to be thrown into driving relation by a shifting yoke 146a to which is attached an operating link 147a which extends to any convenient point for hand operation, the clutch member 154 being splined on the shaft 153. By throwing the clutch members 154 and 153 into driving relation, the shaft 153 may be turned by the motor. On the shaft 153 is secured a beveled gear 155 which meshes with a beveled gear 156 on a shaft 157, said latter shaft extending to the end of the carriage frame and having secured thereto a sprocket wheel over which passes a sprocket chain 158. This chain extends downwardly adjacent the end of the carriage and passes around a sprocket wheel on an axle 159 of the boat carriage. This axle extends throughout the length of the carriage and beyond the same to carry at its ends gear wheels 160 which roll within the channel bars 161, the same corresponding to the channel-bars 11 and 23 in the form first described and shown in Fig. 3, except that the channel-bar 161 is provided with a rack over which the gears 160 roll and with which they mesh.

In the structure shown in Figs. 17 and 18, the clutch members 153 and 154 may be disengaged to permit the carriage to remain stationary on its tracks, while the clutch members 131 and 132 are engaged to rotate the drums 140 and 148, thus to raise the boat or load which is attached to the cables 141 and 149. The carriage may be moved outwardly to any desired position on its track by throwing the clutch members 153 and 154 into driving relation. It will be understood that the detent pawls 81 of Fig. 7 and their operating mechanisms may be employed, if found desirable or necessary, to assist in holding the carriage against accidental movement.

Having thus described my invention, I claim:

1. A device for lowering and raising boats to and from the water comprising a support, a pair of pulleys, means for moving said pulleys from positions over said support to positions over the water, a cable for and passing over each of said pulleys, a winding drum for each of said cables, means for turning said drums and for controlling the same so that they may turn at different speeds, a boat, means for attaching the cables to said boat whereby the boat may be lowered and raised when the pulleys are over the water and the drums are turned, a pair of steadying cables supported at their upper ends from said support and extending therefrom into the water, a weight for and attached to the lower end of each of said steadying cables, the latter cables being spaced apart a distance substantially equal to the length of the boat, and means adjacent the ends of the boat for slidably engaging the respective cables, whereby the boat is prevented from swaying while moving toward and from the water.

2. A device as set forth in claim 1 in which the means adjacent each end of the boat for slidably engaging a steadying cable comprises a pair of members adapted to be closed about the respective cable and means for holding said members in their closed positions and for permitting them to open to release the cables.

3. A device as set forth in claim 1 in which the means adjacent each end of the boat for slidably engaging the steadying cables comprises a pair of elongated semitubular sections hinged together and adapted to be closed about the respective cable or opened to release the boat from the cable, said elongated tubular sections and the cables serving to prevent the boat from tilting.

4. A device for lowering and raising boats to and from the water comprising a support, a stand pivotally mounted on said support, a pair of spaced rails forming a track on said stand, a pair of gates pivoted on the stand and adapted to be closed or to be opened so as to project over the water, a rail for and attached to each of said gates, the latter rails forming continuations of the track on the stand when the gates are open, a carriage mounted on said track and adapted for movement thereon from the said stand to a position on said gates and over the water, a boat, and means connecting said boat and carriage for lowering and raising said boat.

5. A device as set forth in claim 4 having means connecting the support and the stand and adapted to rock the latter whereby the track may be tilted in a vertical direction, for the purpose specified, and means to lock the stand in any position to which it may have been tilted.

6. A device as set forth in claim 4 having means connecting the carriage and the boat for preventing the boat from swaying while it is being lowered and raised.

7. A device as set forth in claim 4 in which the means for lowering and raising the boat comprises a pair of cables attached to the boat at spaced points thereon, pulleys on the carriage over which said cables extend, a pair of winding drums within the boat, each of said cables extending from its respective pulley on the carriage to its respective winding drum, and means within the boat for turning said drums.

8. A device as set forth in claim 4 in which the means for lowering and raising the boat comprises a pair of cables attached to the boat at spaced points thereon, pulleys on the carriage over which said cables extend, a pair of winding drums within the boat, each of said cables extending from its respective pulley on the carriage to its respective winding drum, a motor within the boat, means connecting the motor and the drums for turning the latter, differential gearing connecting the said drums, and means for separately controlling the speed of rotation of each of the drums, whereby the cables may be wound and unwound at different speeds and the boat may be brought to and maintained at an even keel.

9. A device of the character described comprising a support, a pair of spaced track rails projecting from said support and extending over the water, a carriage mounted on said rails and adapted for movement thereon from said support to a position over the water, a boat, means on said carriage from which to suspend said boat, means for lowering and raising said boat to and from the water, steadying means depending from the carriage at opposite ends of the latter, and means attached to the boat adjacent its ends for slidably engaging the steadying means and preventing the boat from swaying as it is raised and lowered, said latter means and the steadying means being also adapted to prevent the boat from tilting when it reaches the water.

10. A device of the character described comprising a support, a pair of spaced track-rails projecting from said support and extending over the water, a carriage mounted on said rails and adapted for movement thereon from said support to a position over the water, a boat, means on said carriage from which to suspend said boat, means for lowering and raising said boat to and from the water, a pair of spaced steadying cables supported by said carriage, a weight for and attached to each of said cables, said weights being adapted to be lowered by their respective cables into the water and be suspended from said carriage free from contact with said support, the steadying cables extending past and adjacent the ends of the boat, means on the boat for slidably engaging said cables as the boat is raised and lowered, and devices on the boat for disconnecting the latter means from the cables.

11. A device for raising and lowering boats to and from the water comprising a support, a pair of pulleys, means for moving said pulleys from positions over said support to positions over the water, a hoisting cable for and passing over each of said pulleys, a boat, means for detachably connecting said cables to the respective ends of the boat whereby the latter may be lowered and raised through said cables when the pulleys are over the water, a plurality of steadying cables supported at their upper ends and extending in spaced relation into the water, a weight for and attached to the lower end of each of said steadying cables, each of said weights being provided with an oil-containing chamber, said chamber being open to the water so that the latter may enter it and displace the oil therein, and means on the boat for slidably engaging the steadying cables, whereby the boat is prevented from swaying while moving to and from the water.

12. A device for raising and lowering boats to and from the water comprising a support, a pair of spaced track-rails projecting from said support and extending over the water, a carriage mounted on said rails and adapted for movement thereon from said support to a position over the water, a pulley mounted on said carriage adjacent each of its ends, a hoisting cable for and passing over each of said pulleys, a boat, means for detachably connecting said cables to the respective ends of the boat whereby the latter may be raised and lowered through said cables when the carriage is over the water, a pair of steadying cables supported at their upper ends on the carriage adjacent the respective pulleys thereon and extending in spaced relation into the water, a weight for and attached to the lower end of each of said steadying cables, said weights being below the surface of the water when they are lowered and remote from the said supports, means rigidly secured to each end of the boat and slidingly engaged with said steadying cables to prevent the boat from swaying as it is raised and lowered and devices on the boat for causing the latter means to release the boat from the cables.

13. A device of the character described comprising a support extending above the water level, a pair of gates pivoted on said support and adapted to be closed so as not to project beyond the support or to be opened to project in parallel arrangement over the water, tracks carried by said gates, a carriage mounted on said tracks and adapted for movement thereon from the support to a position over the water, a load, means on said carriage from which to suspend said load, means for raising and lowering said load from and toward the water, and means for tilting the gates in vertical planes.

14. A structure as set forth in claim 13 having means for positively holding the said gates in any position to which they are tilted.

15. A structure as set forth in claim 13 having means supported by the carriage and adapted to be connected with the load for preventing the latter from swaying as it is raised and lowered.

16. A structure as set forth in claim 13 having a pair of steadying cables connected at one of their ends to the carriage, there being a cable adjacent each end of the carriage, a weight for and connected with the free end of each of said steadying cables, means whereby said weights may be permitted to drop into and be submerged in the water and for raising the weights toward the carriage, and means adapted for connecting the load with said steadying cables for preventing the load from swaying as it is moved toward and from the water.

17. A device of the character described having a support and means projecting from said support over the water, mechanism for tilting said means in vertical planes, a pair of pulleys supported on said means, a boat, hoisting cables attached to said boat and passing over said pulleys whereby the boat may be raised and lowered from and to the water, a pair of steadying cables suspended from said projecting means, a weight for and attached to each of said steadying cables, said weight being adapted to be submerged in the water and free from contact with said support, said steadying cables being spaced apart substantially the length of the boat, means on said boat for slidably engaging said cables as the boat is raised and lowered, and means for disengaging the boat from said cables.

18. Mechanism for raising and lowering boats comprising a pair of drums, a hoisting cable for and connected with each of said drums, means for rotating said drums, a boat, a pair of bolts connected with said boat adjacent the ends thereof, a weight for and carried by each of said hoisting cables, a chain for and attached to each of said cables, and means for detachably connecting said chains to the respective bolts on the boat, the chains being between the latter means and said weights, the construction being such that when the drums are turned to unwind the cables therefrom the boat is lowered to the water and as the boat is lifted by the waves the weights hold the cables taut while the chains flex without disturbing the coils of the cables on the drums.

19. A structure as set forth in claim 18 in which the bolts on the boat are spring-cushioned and the drums are each provided with resiliently mounted rollers for pressing upon the cable coils on the drums and holding them positioned when the boat is lifted by the waves and the cables are relieved of the weight of the boat.

20. A structure as set forth in claim 18 in which each of the hoisting cables is connected with its respective drum by a knot in the end of the cable which engages within a key-hole slot in the drum whereby when the weight on the cable completely unwinds the latter from its drum the cable is automatically released from the drum, for the purpose specified.

In testimony whereof I have signed my name to this specification.

WILLARD CAMPBELL.